Oct. 29, 1957 G. W. SCHATZMAN 2,811,373
FENDER AND FENDER SHIELD ASSEMBLY
Filed June 3, 1954 2 Sheets-Sheet 2
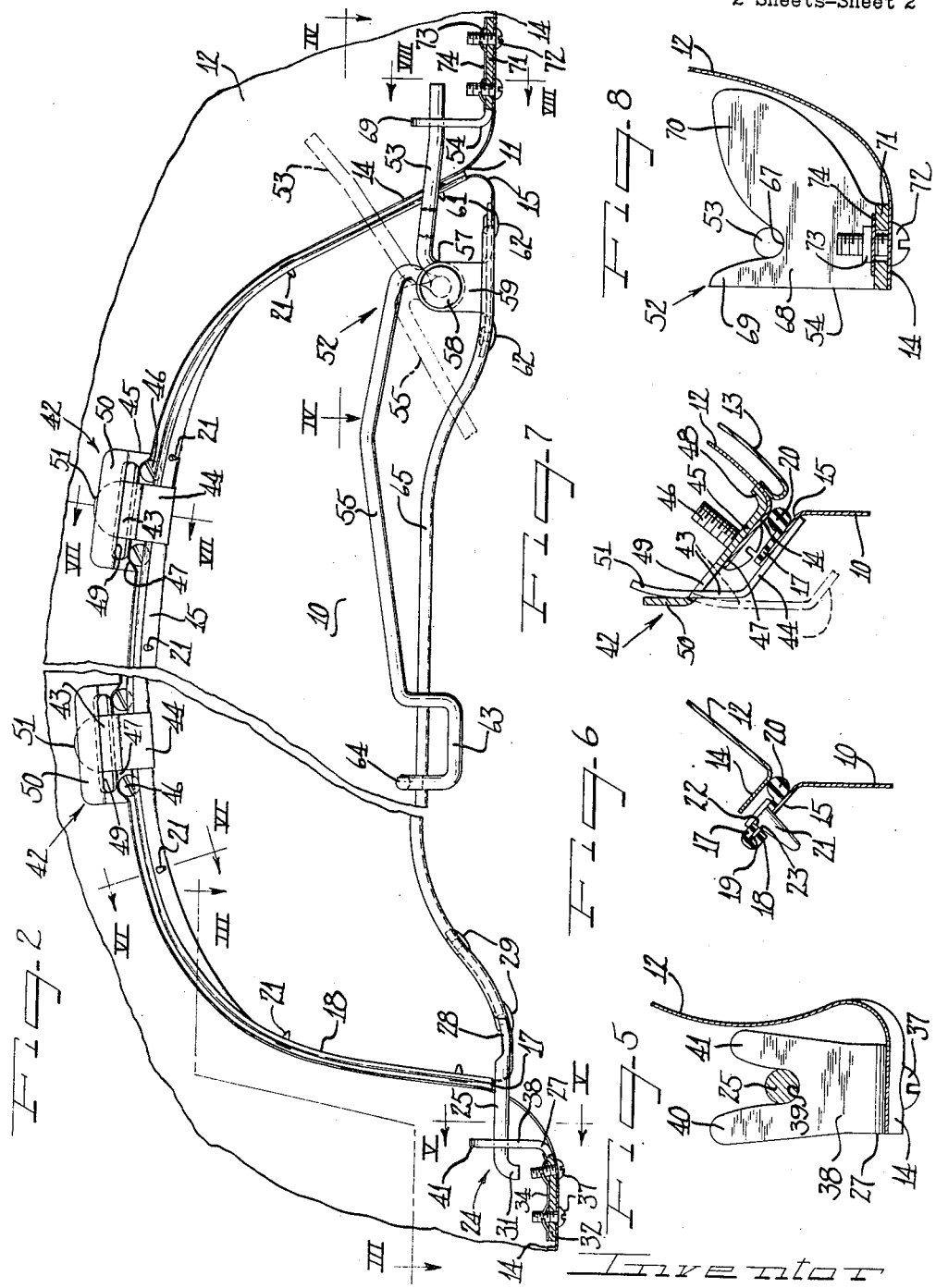
Inventor
George W. Schatzman ary persons.

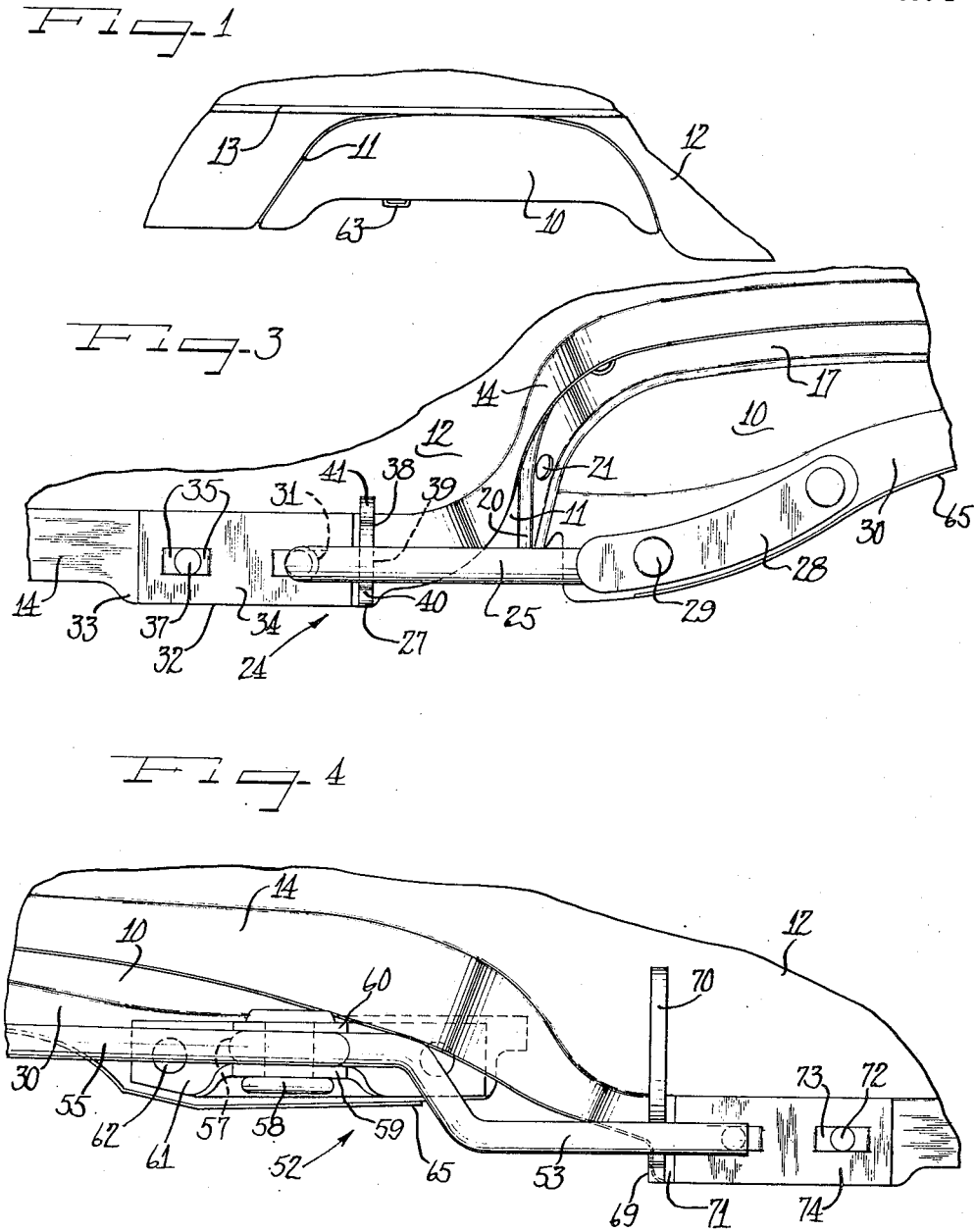

United States Patent Office 2,811,373
Patented Oct. 29, 1957

2,811,373

FENDER AND FENDER SHIELD ASSEMBLY

George W. Schatzman, Detroit, Mich., assignor to Houdaille Industries, Inc., Buffalo, N. Y., a corporation of Michigan Application June 3, 1954, Serial No. 434,132

13 Claims. (Cl. 280—153)

This invention relates to improvements in fender and fender shield assemblies, and more particularly to such an assembly including novel means for attaching the fender and fender shield together.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in a generally axial direction. Since this opening inherently presents an unattractive outward appearance and in high speed operation is an air turbulence factor, detachable fender shields have been employed to cover the opening protectively and ornamentally.

As the term "fender shield" shall hereinafter be employed, it refers to a member which is adapted to be secured to a fender or other portion of a vehicle body for the purpose of covering the opening in the fender or vehicle body and which opening is provided for access to or removal of a vehicle wheel. Such a member is sometimes also referred to as a "fender skirt." Furthermore, as the term "fender" shall hereinafter be employed, it refers to any form of wheel fender in its broad sense, whether such fender be separated from the vehicle part, partly separated from the vehicle body part, or actually an integral part of the vehicle body and whether or not it projects outwardly from the principal body portion of the vehicle.

An important object of the present invention is to provide a novel fender and fender shield assembly in which the fender shield is mounted upon and removably attached to the fender in a novel manner.

Another object of the invention is to provide a novel fender and fender shield assembly in which the attaching means at the upper portion of the fender shield is especially adapted for situations where there is only small clearance between the fender and fender shield assembly and the wheel substantially enclosed thereby, and more especially a limited clearance between the margin of the fender at the top of the wheel access opening and the axle assembly of the vehicle through which the wheel and the tire supported thereby must be moved for removal and replacement.

A further object of the invention is to provide improved means for attaching a fender and fender shield together.

Still another object of the invention is to provide improved means for attaching the ends of a fender shield to a fender.

A still further object of the invention is to provide improvements in the means for attaching the upper portion of a fender shield to a fender.

A still further object of the invention is to provide new and improved means whereby a fender shield is adapted to be mounted securely and efficiently in a simple and easily understood manner and so that it can be conveniently handled by relatively inexperienced persons.

Other objects, features and advantages of the present invention will be readily apparent from the following detailed description of a preferred embodiment thereof taken in conjunction with the accompanying drawings, in which:

Figure 1 is a fragmentary side elevational view of a fender showing a fender shield according to the present invention associated therewith;

Figure 2 is an enlarged fragmental rear elevational view of the fender and fender shield assembly, with certain parts shown in section for purpose of clarity;

Figure 3 is an enlarged fragmentary top plan view taken substantially on the line III—III of Figure 2;

Figure 4 is a fragmentary enlarged top plan view taken substantially on the line IV—IV of Figure 2;

Figure 5 is an enlarged fragmentary sectional elevational view taken substantially on the line V—V of Figure 2;

Figure 6 is a fragmentary sectional detail view taken substantially on the line VI—VI of Figure 2;

Figure 7 is a fragmentary enlarged sectional detail view taken substantially on the line VII—VII of Figure 2; and Figure 8 is a fragmentary sectional elevational view, on an enlarged scale, taken substantially on the line VIII—VIII of Figure 2.

A fender shield 10 according to the present invention is adapted to be assembled in ornamental, protective, closing relation within a wheel access opening 11 in a fender 12 of a vehicle body wherein the fender may comprise substantially part of the body lines. On the fender and extending across the upper margin defining the wheel access opening may be disposed an ornamental or rub rail strip 13. Entirely about the wheel access opening 11 and running across its lower margin, the fender 12 is provided with an inturned reinforcing and finishing flange 14 which is preferably of substantial width. The fender shield has about its upper and end margins an inturned flange 15 generally complementary to the fender flange 14 and adapted to oppose the same in close relation in assembly with the fender, with a resilient sealing gasket 17 carried by the fender shield flange interposed in rattle-proofing, sealing relation.

Herein the sealing gasket 17 (Figs. 2, 6 and 7) comprises a thin flat body strip which lies against the outer face of the fender shield flange 15 and has an underturned inner marginal hook shaped substantially continuous attachment flange 18 providing a socket 19 within which the inner marginal extremity and edge of the fender shield flange 15 is engaged for retaining the sealing strip or gasket in place thereon. At its outer margin the sealing strip or gasket is provided with a substantial, continuous resilient bead 20 which in assembly is placed under sealing compression between the fender flange 14 and the fender shield flange 15 adjacent to juncture of the respective fender and fender shield flanges with the fender 12 and the fender shield 10 respectively. Attachment of the sealing strip 17 to the flange 15 is completed by locking it to the flange 15 by means of generally conically shaped headed frictional press-pins 21 which are projected through respective matching apertures 22 and 23 in respectively the sealing gasket strip 17 and the flange 15. The pins 21 may be made from resilient or substantially rigid elastomeric or plastic material or substantially soft metal and have the tapered thickened neck portions thereof slightly oversize relative to the apertures 22 and 23 so that an effective expansion frictional grip is automatically attained by pressing the pins home until the heads thereof engage the sealing strip. On the other hand, the sealing strip may be easily removed by driving the retaining pins 21 out of engagement by backing out of the apertures within which engaged.

In mounting the fender shield 10 within the wheel access opening 11, one end portion of the fender shield, herein the front end portion thereof, is interconnected with the fender by means of a supporting arm and bracket structure 24 (Figs. 2, 3 and 5) cooperatively located on the lower portion of the front end of the fender shield and the adjacent lower portion of the fender adjacent to the wheel access opening. Separable interengagement of the arm and bracket structure 24 is effected by moving the fender shield generally endwise inwardly and upwardly relative to the fender until an elongated preferably substantially rigid supporting arm 25 projecting endwise beyond the lower end portion of the fender shield 10 is interengaged with a bracket 27 carried by the fender 12. In an efficient form the arm 25 comprises a member that may be made from round bar stock having a forged or otherwise flattened attachment base end portion 28 secured as by means of rivets 29 to a lower marginal inturned flange 30 on the fender 10. At its outer or free end portion the arm 25 is formed with a downturned retaining hook terminal 31 serving as a convenient means for preventing endwise slipping of the arm out of engagement with the bracket 27 after the bracket has been found by the arm in the assembly operation.

The fender carried bracket 27 preferably comprises an angular, generally L-shaped member provided with an elongated base flange 32 which is seated upon the inturned fender flange 14 provided for stability in supporting the bracket 27 with an inward extension portion 33 to underlie the bracket flange 32. Although the bracket flange 32 may be secured permanently to the fender flange, in a preferred arrangement a sheet metal strip nut 34 is employed superimposed upon the flange 32 and with a pair of resilient gripping tensioning flanges 35 struck up at each of a plurality of spaced points for engagement by the threaded shanks of respective screws 37 projecting upwardly through suitable matching screw holes in the fender flange 14 and the bracket flange 32. Thereby the bracket 27 is easily optionally attachable to the fender or removable as desired.

For interengagement with the supporting arm 25, the bracket 27 is provided with an upstanding supporting arm flange 38 facing toward the wheel access opening 11 and provided with an upwardly opening notch 39 properly located to receive the arm 25 in cradled relation and in proper alignment to align the adjacent end portion of the fender 10 in desirable flush position at its outer face with the outer face of the fender 12. Upstanding divergently positioned inner and outer, preferably terminally rounded bifurcation fingers 40 and 41, respectively, are provided at opposite sides of the notch 39. The inner finger 40 is preferably longer than the outer finger 41 and serves to facilitate driving of the arm 25 into the notch or recess 39 as an incident to connecting the arm 25 with the bracket 27 and more especially in finding the bracket 27 with the arm 25 in more or less blind fashion behind the fender which hides the bracket 27 from the person installing the fender shield from the outer side of the fender. The outer arm or finger 41 is preferably arranged to lie close to the adjacent inner face of the fender wall so as to preclude engagement of the supporting bracket arm 25 forwardly of the bracket 27, but assuring that the arm will be guided positively into the notch 39 should it initially be inadvertently moved against the inner face of the fender during installation of the fender shield.

After the fender shield 10 has been initially connected at its forward end to the fender 12 through the medium of the bracket structure 24, the fender shield is swung generally in its plane upwardly into the wheel access opening 11 toward final assembled position, and in so doing one or more, herein shown as a pair of longitudinally spaced upper marginal retaining bracket assemblies 42 become operative to maintain the upper margin of the fender shield and the upper margin defining the wheel access opening in the fender properly aligned in preferably substantially flush arrangement. Herein the retaining bracket assemblies 42 (Figs. 2 and 7) have the dual function of retaining the upper portion of the fender shield 10 against inward displacement relative to the fender and also to assure generally outward compression of the fender shield marginal flange 17, which in at least the portion thereof across the top of the fender shield is angled obliquely inwardly and upwardly, toward the complementally inwardly and upwardly obliquely angled fender flange 14 to place the sealing strip bead 20 under compression against the fender flange. To this end, each of the bracket assemblies 42 comprises a broad upwardly extending tongue 43 provided with an angular oblique leg 44 suitably attached as by welding or the like to the inner face of the fender shield flange 15 so that the tongue or finger 43 projects upwardly in spaced relation inwardly from the edge of the fender shield flange.

For engagement by the finger or tongue 43, a retaining bracket plate 45 is secured as by means of a pair of screws 46 to the upper face of the fender shield flange 14 which for stability in supporting the bracket plate is provided with an extension portion 47 in each instance. At its inner margin, the plate 45 has a turned marginal flange 48 complementary to and seated in reinforcing nested relation within the juncture groove between the fender flange 14 and the adjacent portion of the fender body wall.

The inner and generally upwardly obliquely directed portion of the bracket plate 45 in each instance projects inwardly beyond the edge of the supporting flange portion 47 and has a transverse slot 49 of preferably substantially greater width and length than the thickness and length, respectively, of the finger or tongue 43. At its inner and uppermost extremity, the bracket plate 45 is provided with an upwardly directed keeper flange 50 defining the inner and upper side of the slot 49 and engageable in retaining relation as an abutment bar by the bracket finger 43 extending upwardly through the aperture 49 and abutting the outer face of the keeper flange bar 50.

As the fender shield is swung in its plane upwardly, slightly outwardly tilted cam tips 51 on the respective retaining fingers 43 may engage cammingly against the lower edges of the respective keeper bars, as indicated in dash outline in Fig. 7, and then as the fender shield is moved toward final assembly position the cam tips move the fender shield outwardly as the tips cam upwardly on the respective outer faces of the keeper bars 50 and then retaining finger body portions 40 move upwardly slidably along the keeper bars and locate the fender shield flange 15 properly opposite the fender flange 14 and maintain the fender shield flange in compression relation to the fender flange to press the seal bead 20 firmly thereagainst. Thereby the upper marginal portion of the fender shield is held not only against inward displacement by the retaining fingers 43 and the keeper bars 50, but the fender shield is maintained against outward displacement by the cooperative relationship of the obliquely disposed fender and fender shield upper marginal flanges. Furthermore, the oblique arrangement of the retaining bracket 44 and the upstanding keeper flange bars 50 and the oblique arrangement of the fender marginal flange 14 avoids obstruction to movement thereby in ample clearance relation of a wheel assembly of the vehicle with which the present construction may be used, especially where fairly close spacing prevails between the margin of the fender defining the wheel access opening and a wheel axle assembly.

The final step in securing the fender shield 10 in place on the fender comprises operating a latch assembly 52 at the rear end portion of the fender shield to effect upward tensioning of the fender shield and to secure the rear end portion of the fender shield against both downward and transverse displacement. To this end, the latch mechanism comprises an elongated arm 53 which is swingable between latching and non-latching released positions as shown in full and dash outlines, respectively, in Fig. 2, with respect to a bracket 54 carried by the fender. In a convenient form, the latching arm 53 comprises an angular extension of an elongated resilient rod latch body 55 having adjacent the swingable latch arm 53 a bearing loop portion 57 supported by a journal pin or rivet 58 between upstanding spaced parallel ears 59 and 60 on a bracket plate 61 secured as by means of rivets 62 upon the rear end portion of the fender shield lower marginal inturned flange 30. The latch body 55 is of substantial length and has adjacent its free end portion a handle loop formation 63 provided with a terminal hook 64 adapted to engage retainingly upon the fender shield flange 30 cooperatively with relation to an upstanding reinforcing terminal marginal portion 65 of the fender shield flange.

When the latch arm 53 is swung down toward operative relation with the fender carried bracket 54, it engages in a properly located upwardly opening cradle notch or recess 67 in an upstanding bracket flange 68 on the bracket 54 facing toward the wheel access opening 11. Upstanding bifurcation-like rounded terminal inner and outer fingers 69 and 70, respectively, on the bracket flange 68 flank the latch arm recess 67 (Figs. 4 and 8). The inner finger 69 serves to cam the latch arm 53 downwardly and forwardly into the recess 67, and the outer upstanding divergent finger 70 serves to cam the arm 53 rearwardly and downwardly into the recess 67. It will be observed that the finger 70 is of generally ear shape projecting outwardly into fairly close adjacency to the inner face of the fender wall so as to overlie the gap between the bracket 54 and the fender wall which sweeps outwardly arcuately away from the fender flange 14, thereby avoiding any possibility of misguiding or inadvertent catching of the retaining arms 53 forwardly of the bracket 54. In other words, the finger ear 70 serves, similarly as the finger 41 of the front end bracket 27, as a safety deflector for the bracket with respect to the adjacent portion of the fender wall.

Mounting of the bracket 54 on the fender flange 14 is by means of a generally horizontal angular base flange 71 on the bracket resting upon the fender flange 14 and secured thereto as by means of screws 72 extending up through the fender flange 14 and through registering apertures in the base flange 71 and threaded into resilient gripping flanges 73 of a sheet metal clamping nut 74.

After the fender shield 10 has been maneuvered into position and the front end positioned and attached by means of the bracket structure 24 and the fender shield then rocked up into place so that the upper retaining brackets 42 become operative, and the latch 52 is operated to secure the rear end portion of the fender shield, the latch arm 53 is placed under tension in engagement with the bracket 54 by manipulating the handle 63 into engagement with the fender shield flange 30 and with the hook terminal 64 interlocked with the fender shield flange. This places upward compressive force on the fender shield and assures, in cooperation with the supporting arm 25 at the forward end of the fender shield, a firm resilient anti-rattle cooperation of the margin of the fender shield with the fender, as implemented by the sealing gasket bead 20.

Removal of the fender shield is easily effected by releasing the latch handle 63 and swinging the latch to release the latch arm 53 from the bracket 54, whereupon the fender shield will drop down and can be lifted away from the fender.

It will be understood that modifications and variations may be effected without departing from the scope of the novel concepts of the present invention.

I claim as my invention:

1. In combination in a fender and fender shield construction including a fender having a downwardly opening wheel access opening, a fender shield panel structure having a marginal formation substantially complementary to the outline of said access opening and engageable in said opening by generally upward movement in its plane, said fender and fender shield having respective inwardly and upwardly oblique complementary flanges from juncture with the body portions thereof at the upper margins defining the wheel access opening and the top of the fender shield, respectively, means for connecting the lower end portions of the fender shield to the fender, and cooperative tongue and slotted bracket means on said complementary flanges operative in assembly of the fender shield with the fender to urge the fender shield flange generally outwardly toward the fender flange.

2. In combination in a fender and fender shield construction including a fender having a downwardly opening wheel access opening, a fender shield panel structure having a marginal formation substantially complementary to the outline of said access opening and engageable in said opening by generally upward movement in its plane, said fender and fender shield having respective inwardly and upwardly oblique complementary flanges from juncture with the body portions thereof at the upper margins defining the wheel access opening and the top of the fender shield, respectively, means for connecting the lower end portions of the fender shield to the fender, and cooperative means on said complementary flanges operative in assembly of the fender shield with the fender to urge the fender shield flange generally outwardly toward the fender flange, said means on the flanges comprising a pair of generally inwardly extending slotted brackets on the fender flange and upstanding fingers on the fender shield flange interengaging within the slots in said brackets.

3. In a fender and fender shield construction including a fender having a wheel access opening and a fender shield for closing said opening and movable into said opening in an edgewise approach to a margin defining the opening, a finger of substantial width arranged to project rigidly beyond the margin of the fender shield to lie opposite the inner side of the fender margin at the wheel access opening, and a bracket plate arranged to project rigidly generally inwardly from the fender margin and having an elongated slot therein defined at the inner side thereof by a keeper bar engageable by the finger disposed within the aperture for retaining the margin of the fender shield against inward displacement.

4. In a fender and fender shield assembly including a fender having a wheel access opening therein defined by an inwardly directed flange extending obliquely from the opening and a fender shield having a marginal flange generally obliquely complementary to the fender flange for assembly opposition thereto to maintain the fender shield against outward displacement relative to the fender, a bracket plate supported by the fender flange on the reentrant angle side thereof and projecting generally inwardly obliquely beyond the edge of the fender flange and having an elongated slot in the projecting portion thereof, and a retaining finger carried by the re-entrant angle side of the fender shield flange and having a portion projecting obliquely beyond the fender flange and a finger portion extending angularly therefrom for engagement through said slot and against that portion of the bracket plate at the inner side of said slot for retaining the fender shield against inward displacement relative to the fender.

5. In a fender and fender shield assembly including a fender having a wheel access opening therein defined by an inwardly directed flange extending obliquely from the opening and a fender shield having a marginal flange generally obliquely complementary to the fender flange for assembly opposition thereto to maintain the fender shield against outward displacement relative to the fender, a bracket plate supported by the fender flange on the reentrant angle side thereof and projecting generally inwardly obliquely beyond the edge of the fender flange and having an elongated slot in the projecting portion thereof, and a retaining finger carried by the re-entrant angle side of the fender shield flange and having a portion projecting obliquely beyond the fender flange and a finger portion extending angularly therefrom for engagement through said slot and against that portion of the bracket plate at the inner side of said slot for retaining the fender shield against inward displacement relative to the fender, said angular finger portion having a generally outwardly tilted cam tip portion initially engageable with said bracket plate within said slot.

6. In a fender and fender shield assembly including a fender having a wheel access opening therein defined by an inwardly directed flange extending obliquely from the opening and a fender shield having a marginal flange generally obliquely complementary to the fender flange for assembly opposition thereto to maintain the fender shield against outward displacement relative to the fender, a bracket plate supported by the fender flange on the re-entrant angle side thereof and projecting generally inwardly obliquely beyond the edge of the fender flange and having an elongated slot in the projecting portion thereof, and a retaining finger carried by the re-entrant angle side of the fender shield flange and having a portion projecting obliquely beyond the fender flange and a finger portion extending angularly therefrom for engagement through said slot and against that portion of the bracket plate at the inner side of said slot for retaining the fender shield against inward displacement relative to the fender, said bracket plate having a turned margin engageable in reinforcing relation within the re-entrant juncture of the fender flange with the fender body.

7. In a fender and fender shield assembly including a fender having a wheel access opening therein and a fender shield cooperable with the fender within said wheel access opening, said fender and fender shield having respective opposing generally inwardly directed flanges thereon, a sealing strip carried by one of said flanges for compression between the interfaces of the flanges, said strip and said one flange having aligned apertures therein, and tapered press pin means of generally yieldable self-sustaining material extending through the aligned apertures and with tapered shoulder wedging substantially expansion frictional grip engagement within the aperture in said one flange for securing the strip to said one flange.

8. In a fender shield assembly, a fender shield panel having a marginal flange, a sealing strip carried by said flange and having a return directed flange portion providing a socket engageable with the edge marginal portion of the flange, said strip having a resilient bead disposed adjacent juncture of the fender shield flange with the fender shield panel, and press pin means of generally yieldable self-sustaining material extending through the strip and the flange and having a tapered shoulder wedgingly engaging in substantial expansion frictional grip with the flange for securing the strip in place on the flange.

9. In a fender and fender shield assembly including a fender having a wheel access opening defined by an inturned flange including an upwardly facing portion along the bottom of the fender and a fender shield cooperable within said wheel access opening and having an arm extending endwise therebeyond at one end at the inner side of the fender for generally longitudinally overlying the upwardly facing fender flange portion, and a bracket supported by said upwardly facing fender flange portion and having an upwardly directed supporting flange facing generally toward the wheel access opening and provided with an upwardly opening notch therein defined by bifurcation fingers arranged to guide the arm into the base of the notch as an incident to assembly of the arm with the bracket.

10. In a fender and fender shield combination including a fender having a generally upright wall with a wheel access opening therein and provided adjacent to one side of the wheel access opening on the lower portion of the wall with an inturned upwardly facing flange, a fender shield for substantially closing said opening and having on one lower end portion thereof a supporting arm projecting endwise therefrom for overlying said flange of the fender, and a bracket having a base portion supported by said flange and an upstanding bifurcated flange portion facing toward the wheel access opening and providing an upwardly opening slot retainingly receptive of said arm of the fender shield, said bifurcated portion having a finger-like bifurcation portion extending upwardly and laterally from the base portion of the bracket in a leaning fashion toward and into proximity to the inner face of the wall of the fender so as to preclude entry of the arm between the bracket and the wall of the fender incident to mounting of the fender shield in closing relation to the wheel access opening and assembly of the arm in the slot of the bracket.

11. In a fender and fender shield assembly including a fender having a wheel access opening defined by an inturned flange including respective upwardly facing portions on the bottom of the fender adjacent to each of the opposite ends of the wheel access opening and a fender shield cooperable with the fender for closing the wheel access opening and having an arm extending endwise from each respective end portion of the fender shield and therebeyond at the inner side of the fender shield and fender for generally longitudinally overlying the respective upwardly facing fender flange portion adjacent thereto, and each of said upwardly facing fender flange portions having a bracket supported thereby, each of said brackets having an upwardly directed supporting flange facing generally toward the wheel access opening and provided with an upwardly opening notch therein defined by bifurcation fingers arranged to guide the arm into the base of the notch as an incident to assembly of the arm with the bracket.

12. In a fender and fender shield assembly including a fender having a wheel access opening defined by an inturned flange including respective upwardly facing portions on the bottom of the fender adjacent to each of the opposite ends of the wheel access opening and a fender shield cooperable with the fender for closing the wheel access opening and having an arm extending endwise from each respective end portion of the fender shield and therebeyond at the inner side of the fender shield and fender for generally longitudinally overlying the respective upwardly facing fender flange portion adjacent thereto, and each of said upwardly facing fender flange portions having a bracket supported thereby, each of said brackets having an upwardly directed supporting flange facing generally toward the wheel access opening and provided with an upwardly opening notch therein defined by bifurcation fingers arranged to guide the arm into the base of the notch as an incident to assembly of the arm with the bracket, the bifurcation fingers of the respective brackets located nearest the wall of the fender being disposed in such close proximity to the adjacent face of the fender wall as to preclude entry of the respective arm of the fender shield between the bracket and the wall of the fender incident to reception of the respective arm in the respective upwardly opening notch provided by the bracket.

13. In a fender and fender shield assembly including a fender having a wheel access opening defined by an inturned flange and a fender shield having an inturned flange and engageable within the wheel access opening with said flanges in face-to-face relation, said flanges having thereon respective coacting separable bracket members for retaining the fender shield in predetermined assembled relation to the fender in said wheel access opening, the bracket on the fender flange having attachment means comprising at least one screw member having a head on the face of the fender flange that opposes the fender shield flange and spaced inwardly from the margin of the fender flange that joins the fender proper, and a gasket carried by the fender shield flange and having a bead-like portion engageable with said fender flange margin outwardly adjacent to the screw head and providing a spacer between the flanges affording clearance therebetween for said screw head and sealing such clearance at the outer side thereof.

References Cited in the file of this patent

UNITED STATES PATENTS

| Number | Name | Date |
|---|---|---|
| 2,048,862 | Haltenberger | July 28, 1936 |
| 2,088,955 | Hamill | Aug. 3, 1937 |
| 2,222,619 | Jandus | Nov. 26, 1940 |
| 2,336,536 | Fergueson | Dec. 14, 1943 |
| 2,369,035 | Fergueson | Feb. 6, 1945 |
| 2,611,628 | Schatzman | Sept. 23, 1952 |
| 2,616,721 | Schatzman | Nov. 4, 1952 |
| 2,620,204 | Hammond | Dec. 2, 1952 |
| 2,655,389 | Soroka | Oct. 13, 1953 |
| 2,671,672 | Schatzman | Mar. 9, 1954 |